United States Patent [19]

Webb et al.

[11] Patent Number: 5,625,808
[45] Date of Patent: Apr. 29, 1997

[54] READ ONLY STORE AS PART OF CACHE STORE FOR STORING FREQUENTLY USED MILLICODE INSTRUCTIONS

[75] Inventors: Charles F. Webb, Poughkeepsie; Mark S. Farrell, Pleasant Valley; Barry W. Krumm, Poughkeepsie; John S. Liptay, Rhinebeck; Jennifer S. A. Navarro; Steven B. Risch, both of Poughkeepsie; Mark A. Check, Hopewell Junction, all of N.Y.

[73] Assignee: International Business Machines Corporation, Armonk, N.Y.

[21] Appl. No.: 455,820

[22] Filed: May 31, 1995

Related U.S. Application Data

[62] Division of Ser. No. 414,821, Mar. 31, 1995.
[51] Int. Cl.$^6$ .................................................. G06F 9/22
[52] U.S. Cl. ............................................ 395/598; 395/381
[58] Field of Search ........................ 395/375, 470, 395/500, 421.1, 800, 421.03, 200.1, 737, 182.06, 775, 598

[56] References Cited

U.S. PATENT DOCUMENTS 4,691,277  9/1987  Kronstadt et al. .................. 395/421.03
4,751,703  6/1988  Picon et al. ......................... 395/182.06
5,072,364  12/1991  Jardine ................................. 395/375
5,109,495  4/1992  Fite et al. ............................. 395/375
5,226,130  7/1993  Favor et al. .......................... 395/375

Primary Examiner—William M. Treat
Assistant Examiner—Gautam R. Patel
Attorney, Agent, or Firm—Lynn L. Augspurger; Laurence J. Marhoefer

[57] ABSTRACT

A read only storage (ROS) array holds a small set of relatively simple millicode instructions; those millicode instruction routines which are most commonly called on in executing common application workloads. The millicode read only store is implemented as a portion of hardware system area (HSA) storage. The cache control includes a register which contains hardware system area address corresponding to the read only store address. When an instruction fetch request is received by the cache control, the absolute address of the instruction fetch request is compared with the read only store address in the register in parallel with the normal cache directory lookup. If the instruction fetch request matches the read only store address, the fetch is made from the read only store independently of the directory lookup result.

6 Claims, 3 Drawing Sheets

READ ONLY STORE AS PART OF CACHE STORE FOR STORING FREQUENTLY USED MILLICODE INSTRUCTIONS

This is a division of copending application Ser. No. 08/414,821 of Charles F. Webb et al., filed on Mar. 31, 1995, for Millicode Read-Only Storage With Entry-Point Patch Control.

BACKGROUND OF THE INVENTION

FIELD OF THE INVENTION

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to an improved read only store as part of cache store for storing frequently used millicode instructions; a read only store which can be simply addressed using a single instruction fetch mechanism for all system instructions.

CROSS REFERENCE TO RELATED APPLICATIONS

The present United States patent application is related to the following co-pending United States patent applications which are assigned to the assignee of the present application.

Application Ser. No. 08/414,154, filed Mar. 31, 1995 (attorney Docket No. PO9-94-045), entitled "Specialized Millicode Instruction."

Application Ser. No. 08/414,977, filed Mar. 31, 1995 (attorney Docket No. PO9-94-056), entitled "Hardware Retry Trap For Millicoded Processor."

Application Ser. No. 08/414,158, filed Mar. 31, 1995 (attorney Docket No. PO09-94-060), entitled "Addressing Extended Memory Using Millicode."

Application Ser. No. 08/414,812, filed Mar. 31, 1995 (attorney Docket No. PO09-94-061), entitled "Mapping Processor State Into A Millicode Addressable Processor State Register Array."

Application Ser. No. 08/414,164, filed Mar. 31, 1995 (attorney Docket No. PO09-94-062), entitled "Linking Program Access Register Number With Millicode Operand Access."

Application Ser. No. 08/414,961, filed Mar. 31, 1995 (attorney Docket No. PO9-94-069), entitled "Priority And Recovery Method For Serialization of System Quiesce State."

DESCRIPTION OF THE PRIOR ART

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

In some millicoded designs, the millicode is stored in, and fetched from, a special array in the processor. A special millicode array keeps millicode instructions out of the cache used by program instructions, but requires instruction fetching controls separate from those used for program (base architecture) instructions, and constrains the amount of storage available for millicode. An alternative is to store millicode instructions in a special portion of main storage (i.e. the "hardware system area" or HSA, as is used in IBM systems) and to use the normal instruction fetching controls for millicode instruction fetches. This keeps the instruction fetching controls simple, but consumes space in the same cache as is used for program instructions and causes delays when waiting for cache misses to be resolved from the storage subsystem.

An object of this invention is the provision of a millicode instruction read only store, which can be addressed by a single instruction fetch mechanism for all system instructions.

Another object of this invention is the provision of a read only store for millicode instructions which can be disabled in the event of hardware faults in the read only store or changes in stored millicode instructions without loss of system functionality.

A further object of this invention is the provision of a read only store which can be patched in the event of a read only store fault or instruction change without affecting other millicode instructions and without limit to the number of millicode routines patched.

Briefly, this invention contemplates the provision of a read only storage (ROS) array which holds a small set of relatively simple millicode instructions; those millicode instruction routines which are most commonly called on in executing common application workloads. The millicode read only store is implemented as a portion of hardware system area (HSA) storage. That is, the contents of the read only store are also stored at a particular hardware system area address; preferably at the beginning address of that portion of the hardware system area designated for millicode storage. The cache control includes a register which contains hardware system area address corresponding to the read only store address. When an instruction fetch request is received by the cache control, the absolute address of the instruction fetch request is compared with the read only store address in the register in parallel with the normal cache directory lookup. If the instruction fetch request matches the read only store address, the fetch may be made from the read only store independently of the directory lookup result. If the instruction fetch request address does not match the read only store address, the cache access proceeds normally, ignoring the read only store. A read only store address match is treated as a cache hit with respect to the system fetch and response interface, and the instruction fetch control sees no difference between a cache hit and a read only store hit.

When a millicoded processor encounters an instruction which is not directly implemented in hardware, it must form a starting millicode instruction address as part of the process of entering millicode to perform the specified operation. In general, this address is formed as an offset from the start of the millicode area (which is stored in a register in the instruction unit portion of the processor). This offset is generated via a transformation of the instruction operation code; this is essentially similar to the formation of a starting control storage address for a microcoded processor, and various techniques are well known.

With this invention, these "standard" starting millicode addresses are all located outside of the storage contained in the read only store. A small subset of the base architecture instructions are then identified as having entry points within the read only store; these entry point addresses are separated so as to allow a significant number of millicode instructions before having to branch around the next entry point. Independently of the formation of the standard millicode entry address, logic in the instruction decode hardware determines if the instruction being decoded is one of those to which a read only store entry point has been assigned. If it is, this logic forms a read only store entry index and indicates that this index is valid for the current instruction. For read only store entry points, the millicode starting address is formed by concatenating the high-order address bits of the hardware system area contained in the read only store, the read only store index, and the appropriate number of 0s to obtain the desired spacing of read only store entry points.

The instruction unit logic must then determine:

1. Is this instruction one which is to be implemented in millicode?

2. If so, should the standard millicode starting address or the read only store entry address be used?

Generally, if the read only store index is valid, then the read only store entry point will be used. In the event of a problem with the code in the read only store, however, a mechanism is needed to avoid the affected read only store entry points and use the standard entry points for those instructions; since the standard entry points are outside of the read only store and are in the hardware system area portion of main storage, they can be modified easily without changing any hardware (unlike read only store). The mechanism provided by this invention is a register containing one bit for each read only store entry point. The read only store index is used to select one bit from this register, and that bit modifies the "read only store index valid" indication to the logic which determines the starting millicode address. If the read only store index is not valid, or if the bit in this "read only store patch control" register corresponding to that index indicates that the entry point has been patched, then the standard (non-read only store) millicode starting address is used; conversely, the read only store entry address is used if the entry point is valid and the read only store patch control bit for the read only store index indicates that entry point has not been patched. In this way, any combination of read only store entry points can be overridden to work around any number of problems without affecting the other instructions for which the millicode is in read only store. This provides great patch flexibility with minimal performance loss outside of the scope of the patch itself.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket P09-93-035, Ser. No. 08/149,260, filed Nov. 9, 1993, assigned to the assignee of this application, and also incorporated herein by reference.

Figure 1:
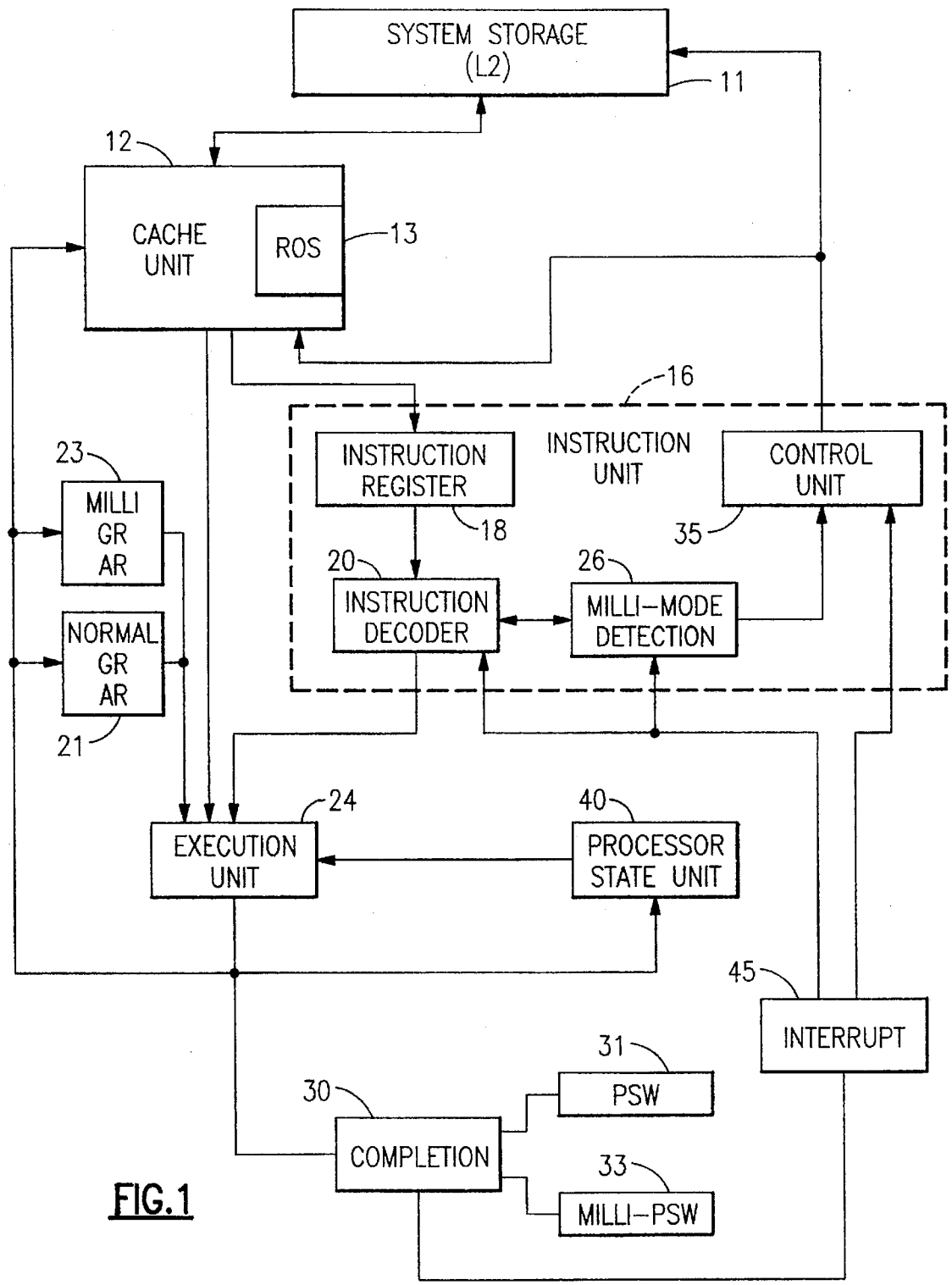
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored. An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 35 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers.

A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 sends appropriate signals to the decoder 20, the instruction fetch controls 35, and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 30 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Figure 2:
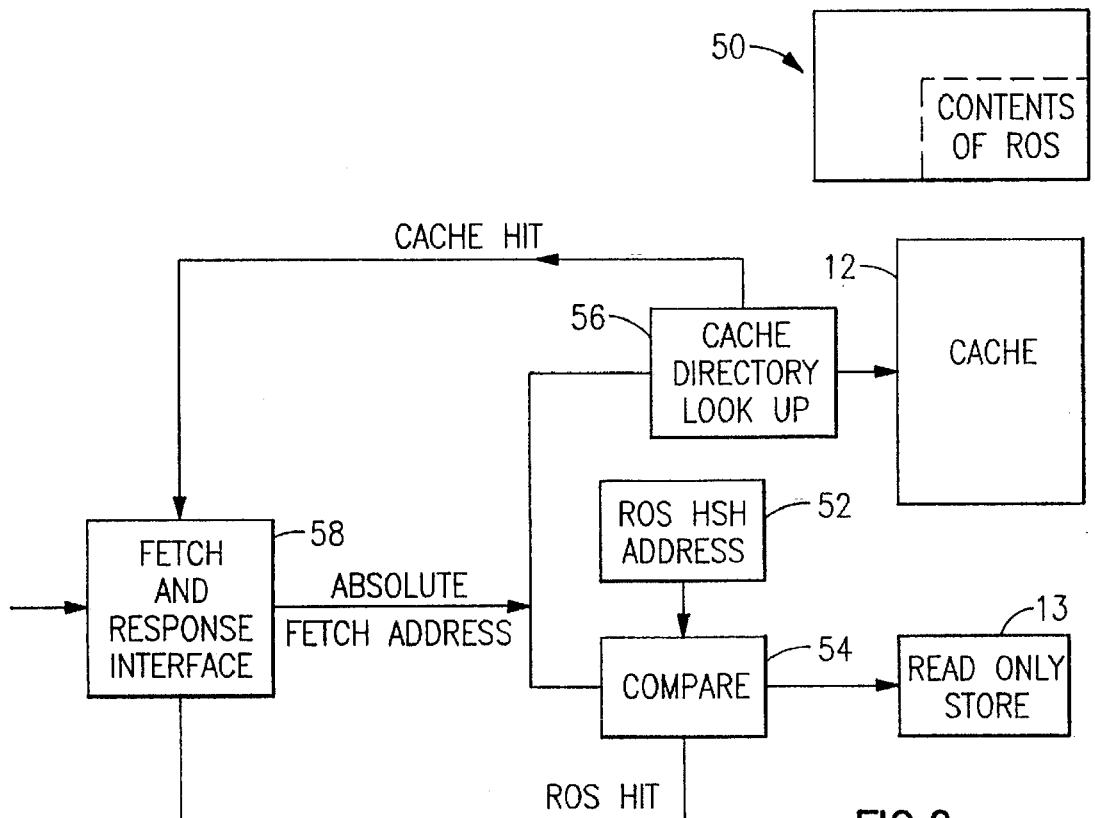
FIG. 2 is a block diagram showing elements of the system related to the ROS cache of this invention in more detail.

Referring now to FIG. 2, the contents of read only store 13 are also stored at a particular address in HSA 50. In the preferred implementation, this address is at the beginning of the portion of HSA designated for millicode. The read only store 13 may be any size, but the simplest implementation is one that uses a power-of-2 size (e.g. 32K bytes).

The read only store 13 is implemented as part of an overall cache design; if the processor has separate caches for operands and instructions, the read only store 13 would be implemented with the instruction cache. The cache controls (BCE) include a register 52 which contains the HSA address for the content of the read only store in the HSA 50. When an instruction fetch request is received by the cache control, a comparator 54 compares its absolute address with the content of the read only store address register 52 in parallel with a normal lookup in a cache directory 56. If the instruction fetch address matches the read only store address, the fetch may be satisfied from the read only store independently of the directory lookup results. If the address does not match the read only store address, the cache access proceeds normally, ignoring the read only store. A read only store address match is treated as a cache hit with respect to the fetch and response interface 58, so that the instruction fetch controls see no difference between a cache hit and a read only store hit.

Any absolute address match with the read only store address is preferably treated as a read only store hit. An alternative design may restrict read only store hits to accesses originally specified as HSA fetches, since this allows the comparison to be done on the logical address (prior to any translation) since this is the same as the absolute address. In a single-cache design, there is no need to limit read only store hits to instruction fetches, and there may be some advantage in allowing operand fetches to be satisfied from the read only store also. Operand stores should never match the read only store address: program instructions which attempt to access HSA receive an addressing exception, and correctly functioning millicode routines should never attempt to store into the millicode area. It is thus allowable for the hardware to indicate an error if an attempt is made to store into the read only store.

In the event that the hardware detects an error (e.g. via checking bits) in the read only store, the read only store (or any portion of it) may be disabled in the cache control by blocking all read only store address matches. In this case, fetches, which would have been satisfied from the read only store, will instead receive their data from the HSA storage to which the read only store corresponds. This yields a loss in performance but has no other effect on operations.

When a millicoded processor encounters an instruction which is not directly implemented in hardware, it forms a starting millicode instruction address as part of the process of entering millicode to perform the specified operation. In general, this address is formed as an offset from the start of the millicode area, which is stored in a register in the instruction unit portion of the processor. The offset (i.e. index) is generated via a transformation of the instruction operation code; this is essentially similar to the formation of a starting control storage address for a microcoded processor, and various techniques well known in the prior art are suitable for millicode.

In using the read only store 13 of this invention, these "standard" (i.e. non-ROS stored) starting millicode addresses are all located outside of the range of starting address for the instruction sequences contained in the read only store 13. A small subset of the base architecture instructions are then identified as having entry points within the read only store 13; these entry point addresses are separated, one from another, so as to allow a significant number of millicode instructions before having to branch around the next entry point. Independently of the formation of the standard millicode entry address, logic in the instruction decode hardware determines if the instruction being decoded is one of those to which a read only store entry point has been assigned. If it is, this logic forms a read only store entry index and indicates that this index is valid for the current instruction which is to be executed in millicode. Read only store entry points for a millicode starting address are formed by a concatenation of the high-order address bits of the hardware system area, which store the read only store contents, the entry index value of the read only store, and an appropriate number of 0s to obtain the desired spacing of read only store entry points.

Figure 3:
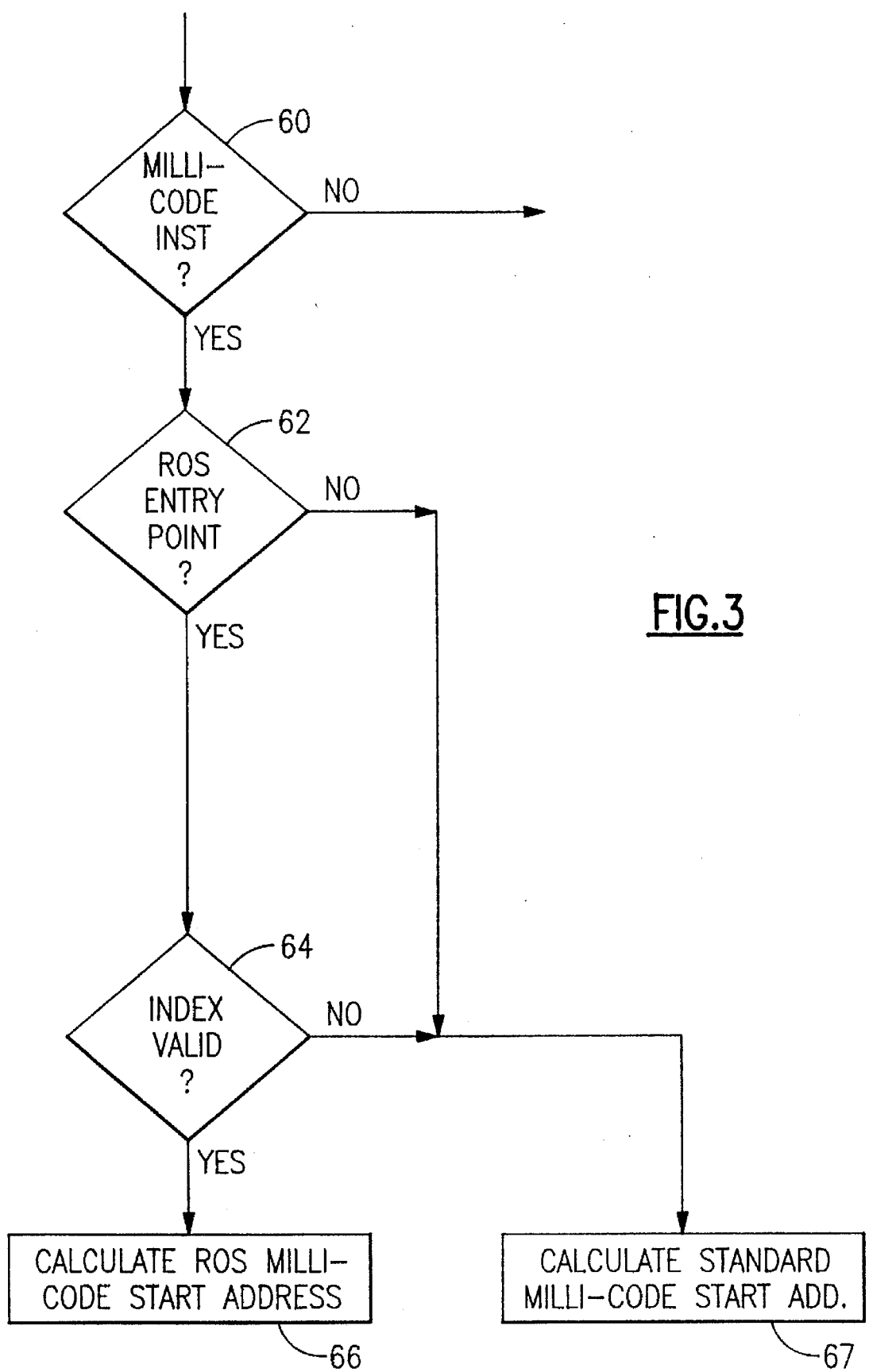
FIG. 3 is a flow chart illustrating the steps in addressing the millicode read only store cache in accordance with the teachings of this invention.

The process is illustrated in FIG. 3. The instruction unit logic determines, at block 60, if this is an instruction to be implemented in millicode. If yes, a decision is made in decision block 62 whether a standard millicode starting address or the read only store entry address is to be used. If the read only store entry address is to be used, block 64 checks to see if the read only store index is valid. If valid, the read only store entry point is used, block 66. If invalid, standard millicode starting address is activated, block 67.

Figure 4:
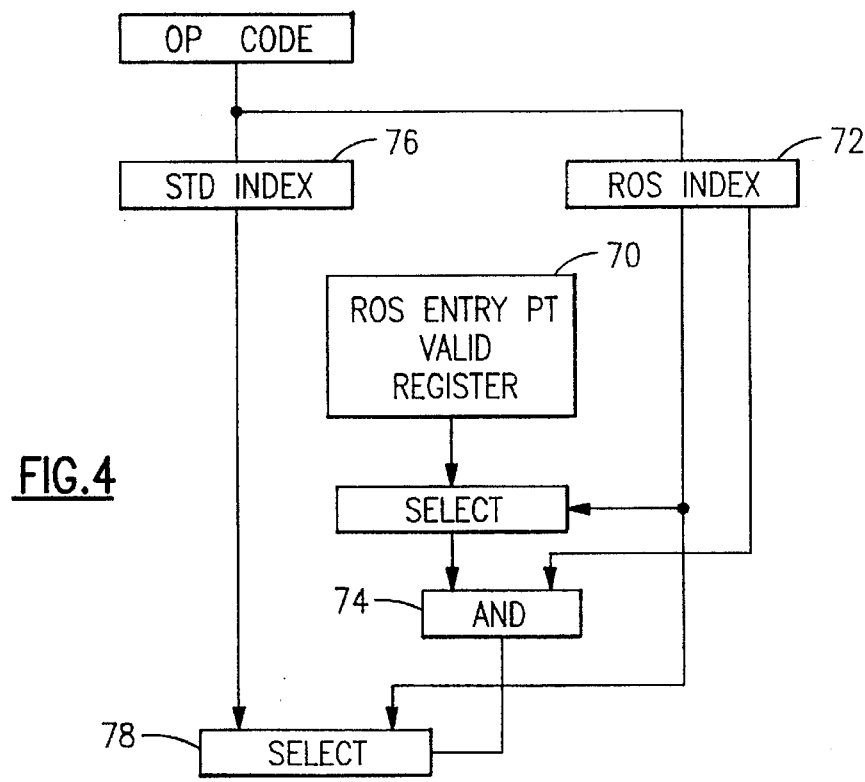
FIG. 4 is a logic diagram of a patch control for the millicode read only store.

Referring now to FIG. 4, in the event of a problem with the code in the read only store 13, a mechanism is needed to avoid the read only store entry points affected by the problem, and use the standard entry points for those instructions. Since the standard entry point addresses are outside of read only store address range and are in the hardware system area portion of main storage, these instructions can be modified easily without changing any hardware (unlike read only store). The mechanism provided by this invention includes a register 70, which contains one bit corresponding to each read only store entry point. The read only store index 72 is used to select the bit from register 70 corresponding to the index and that bit is ANDed in gate 74 with a "read only store index valid" bit with the index. If the read only store index is not valid, or if the bit in this "read only store patch control" register 70 corresponding to that index indicates that the entry point has been patched, then the output of gate 74 enables selector 78 so that the standard (non-read only store) millicode starting address 76 is used, block 67 of FIG. 3. Conversely, the read only store entry index 72 is used if the entry point is valid and the read only store patch control bit for the read only store index indicates that entry point has not been patched. In this way, any combination of read only store entry points can be overridden to work around any number of problems without affecting the other instructions for which the millicode is in read only store. This provides great patch flexibility with minimal performance loss outside of the scope of the patch itself.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A millicode addressing method for a pipelined computer processor, which executes a relatively simple instruction set in a hardware controlled execution unit and executes a relatively complex instruction set in a milli-mode architected state with a millicode sequence of simple instructions in said hardware controlled execution unit, comprising the steps of:

storing in a millicode read only memory a plurality of millicode instruction sequences in an address space;

fetching millicode instruction sequences from a cache memory by means of a cache memory address lookup directory, a register in which are stored addresses of said address space, and a comparator for comparing an instruction fetch address with a address space address stored in said register;

processing an instruction fetch at a millicode instruction address by performing a lookup operation in said cache memory address lookup directory and contemporaneously comparing said millicode instruction address to said stored addresses of said address space which are stored in said register and said cache control means fetching an addressed millicode sequence from said millicode read only store when said instruction fetch address matches said stored addresses of said address space which are stored in said register.

2. A millicode addressing method as in claim 1 further including the step of voiding fetches from said millicode read only store in order to avoid a read only store entry point.

3. A millicode addressing method as in claim 2 further including a hardware area storage and a step of storing millicode instruction sequences including a copy of said plurality of millicode instruction sequences stored in said millicode read only memory in said hardware storage area.

4. A millicode addressing method as in claim 1 further including a hardware area storage and a step of storing millicode instruction sequences including a copy of said plurality of millicode instruction sequences stored in said millicode read only memory in said hardware storage area.

5. A millicode addressing method for a pipelined computer processor as in claim 4 wherein said cache control means fetching an addressed millicode instruction sequence from said millicode read only store is signaled as a cache hit.

6. A millicode addressing method for a pipelined computer processor as in claim 1 wherein said cache control means fetching an addressed millicode instruction sequence from said millicode read only store is signaled as a cache hit.

* * * * *